United States Patent [19]

Johannesson

[11] 4,278,018
[45] Jul. 14, 1981

[54] PRINTING MEANS

[75] Inventor: Brian J. Johannesson, Waterloo, Canada

[73] Assignee: NCR Canada Ltd. - NCR Canada Ltee, Mississauga, Canada

[21] Appl. No.: 95,705

[22] Filed: Nov. 16, 1979

[51] Int. Cl.$^3$ .............................................. B41J 1/00
[52] U.S. Cl. .................................... 101/93; 101/287; 101/368; 400/103
[58] Field of Search .................... 101/99, 43.04, 93.35, 101/93.36, 109, 110, 287, 368, 93; 400/103

[56] References Cited

U.S. PATENT DOCUMENTS

| | | | |
|---|---|---|---|
| 2,776,618 | 1/1957 | Hartley | 101/110 X |
| 3,111,085 | 11/1963 | Hayek | 101/109 X |
| 3,141,403 | 7/1964 | Brown et al. | 101/99 |
| 3,738,263 | 6/1973 | Combs et al. | 101/90 X |
| 3,983,805 | 10/1976 | Perkett et al. | 101/99 X |
| 3,998,571 | 10/1976 | Blair et al. | 101/2 |
| 4,015,521 | 4/1977 | Neff | 101/99 |
| 4,165,687 | 8/1979 | Tezuka | 101/99 X |

FOREIGN PATENT DOCUMENTS

| | | | |
|---|---|---|---|
| 82420 | 1/1921 | Austria | 101/109 |
| 1013615 | 7/1977 | Canada | 101/109 |

Primary Examiner—Edgar S. Burr
Assistant Examiner—C. A. Pearson
Attorney, Agent, or Firm—J. T. Cavender; Albert L. Sessler, Jr.

[57] ABSTRACT

A printing device is provided for printing bar code or other indicia on record media such as bank checks and similar documents. The bar code indicia consists of a series of symbols which may be "01" or "10", in which "1" is represented by the presence of a bar and "0" is represented by the absence of a bar in a possible bar position on the record media. The printing device includes a platen having two angled printing surfaces, each of which may be in the configuration of a bar, on one end and being rockable between two positions in each of which one of the printing surfaces is parallel to the path of movement of the record media, and the other of said surfaces is not. A hammer driven by a constant-speed cam coacts with the printing surfaces on the platen to print on the record media during each cycle of cam rotation, and suitable controls position the platen by means of a solenoid during each cycle to determine whether a first symbol or a second symbol will be printed.

9 Claims, 3 Drawing Figures

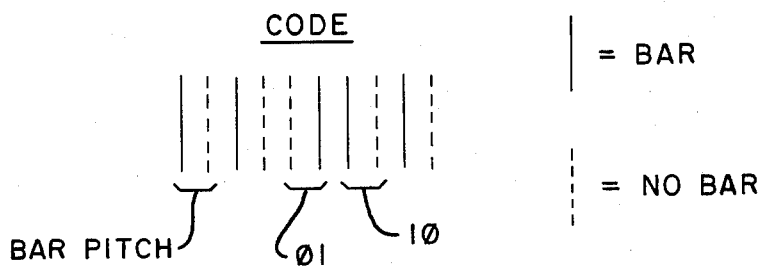
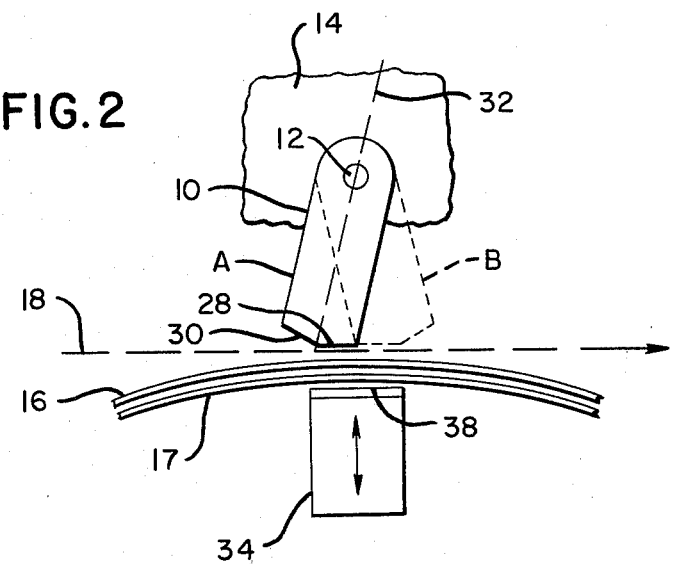

PRINTING MEANS

BACKGROUND OF THE INVENTION

Bar codes have found increasing numbers of uses in recent years in connection with machine sensing of documents, containers, railway cars, etc. A bar code is relatively simple to sense, and enables the storage of a substantial amount of information in a relatively small area.

One use for bar coding which has been proposed, and which appears to have a number of important advantages, is in association with bank checks to provide a check or document identification number (DIN) which can be imprinted upon a check or other document as it enters a financial institution for processing, and can be subsequently sensed from the check and used in document sorting and other processing. A number of methods have been proposed for printing of such bar code information, including ink jet printing. One representative document handling system employing ink jet printing means for printing of bar codes on documents is shown in U.S. Pat. No. 3,988,571, issued on Oct. 26, 1976.

Bar codes may be printed by mechanical impact-type printers, as well as ink jet printers. One type of mechanical bar code printer, employed in printing a color bar code, consisting of bars of different colors in accordance with a predetermined code, is shown in U.S. Pat. No. 3,738,263, issued on June 12, 1973, and assigned to the assignee of the present Application. Another type of color bar code printer is disclosed in Canadian Pat. No. 1,013,615, issued July 12, 1977, and also assigned to the assignee of the present Application.

SUMMARY OF THE INVENTION

The present invention relates to printing devices, and more particularly relates to apparatus for printing bar code indicia on record media, such as bank checks and similar documents.

In accordance with one embodiment of the present invention, apparatus for printing bar code indicia on record media moving in a path through said apparatus comprises a pivotally mounted platen capable of movement between first and second positions, one end of said platen including two abutting rectangular flat printing surfaces each disposed at an angle such that it is parallel to the path of movement of the record media on which printing is to be performed when the platen is in one of said two positions, and at an acute angle thereto when said platen is in the other of said positions; first means for causing said platen to be moved to one of said positions; second means for causing said platen to be moved to the other of said positions; hammer means movable between an inactive position and a striking position for effecting printing on said record media in said path by engaging said record media between a face of said hammer means and one of said flat surfaces of the platen; and means for moving said hammer means between said inactive position and said striking position.

It is accordingly an object of the present invention to provide a novel and efficient printing apparatus.

Another object is to provide a bar code printing apparatus capable of printing either in "01" or a "10" symbol during each cycle of printing operation.

A further object is to provide a bar code printing apparatus including a rockable platen having two flat printing surfaces at one end thereof, each surface corresponding to the configuration of a bar element of a bar code symbol, said platen being rockable between first and second positions to cause printing of either a "01" or a "10" symbol.

A further object is to provide a bar code printing apparatus employing a constant speed hammer driving means, which permits faster printing speeds.

A further object is to provide bar code printing apparatus comprising a platen movable between two positions and a hammer driven so as to coact with said platen during each cycle of operation to effect printing of a selected one of two different symbols.

With these and other objects, which will become apparent from the following description, in view, the invention includes certain novel features of construction and combination of parts, a preferred form or embodiment of which is hereinafter described with reference to the drawings which accompany and form a part of this specification.

BRIEF DESCRIPTION OF THE DRAWINGS

FIG. 1 is a diagrammatic view illustrating one type of code which is suitable for imprinting on record media using the printing apparatus of the present invention.

FIG. 2 is a diagrammatic view showing the manner in which the platen and hammer of the present invention coact with record media to produce the desired printing.

DETAILED DESCRIPTION OF THE INVENTION

Figure 3:
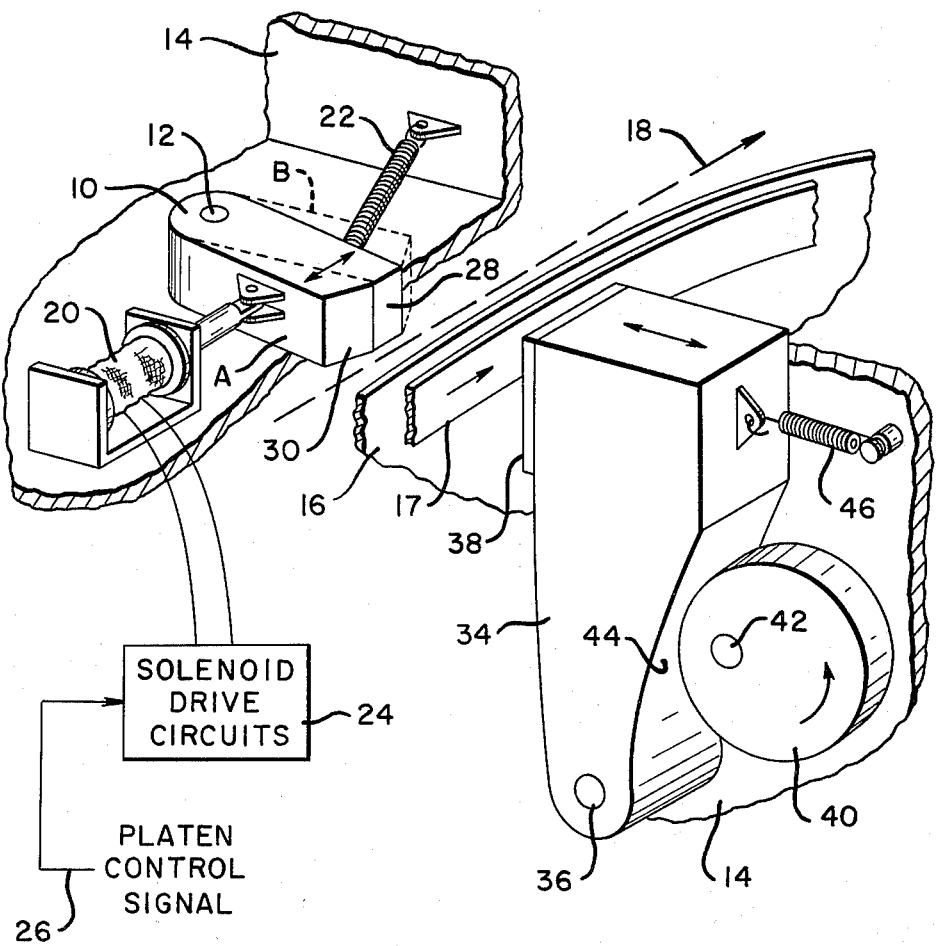
FIG. 3 is a perspective view of one embodiment of the printing apparatus of the present invention.

The printing apparatus of the present invention may be used in printing many types of indicia and is not limited to the printing only of bar-type codes. However, the invention does lend itself very well to the printing of bar-type codes, and therefore the embodiment of the invention described herein is directed to the printing of a code in which each code element comprises either a space and a bar (referred to hereinafter as "01"), or a bar and a space (referred to hereinafter as "10").

As shown in FIG. 1, a solid line represents the printing of a bar, or "1", while a dashed line represents no printing in that space, which may be considered to be a possible bar position, or "0". The "pitch" or width of a character or symbol in each instance includes two bar positions, only one of which is printed, so that the character or symbol will always be either "01" or "10". Thus, the exemplary wood appearing in FIG. 1 is 10, 10, 01, 10, 10. This word can obviously be given a desired significance in accordance with the particular coding scheme selected.

The bar code may be printed on a document utilizing either a conventional ink, a magnetic ink, or some other type of ink which can be sensed using special equipment, such as a fluorescent ink. The use of magnetic ink, for example, has a number of advantages in association with documents such as bank checks. There is no problem in distinguishing magnetic indicia from other information imprinted on the check in conventional ink. Also, a highly-developed technology for reading magnetically-encoded information from checks already exists, in the commonly-used MICR (magnetic ink character recognition) readers. The information which is thus sensed from the checks can be decoded, using wellknown magnetic tape, disc and drum decoding techniques.

Referring now to FIGS. 2 and 3, there is shown a platen 10 which is rockably mounted on a shaft 12 secured to a support member 14. The platen 10 is movable between a first position A shown in solid lines in FIGS. 2 and 3, and a second position B shown in dashed lines in these Figures for printing on record media 16 moving in a path 18. The record media 16 may be of the carbon or carbonless transfer type, or if desired, a magnetic ink or other type of ribbon 17 may be employed. The platen may be moved from one position to the other by any suitable means, such as a solenoid 20 which may also be mounted on the support member 14, coacting with a return spring 22, connected to said platen and to the support member 14.

Energization of the solenoid may be controlled by a suitable controller 24, which in turn may be controlled by an input signal applied through an input circuit 26 from an appropriate device such as a data processing system or a buffer (not shown).

The platen 10 is provided at one end with a plurality of printing means. While these printing means could take other forms, in the illustrated embodiment they comprise two planar rectangular angled surfaces 28, 30, each having the configuration of the bar which is to be printed by the apparatus. As may best be seen in FIG. 2, the angle of the plane of each of the surfaces 28, 30 with respect to a plane 32 extending through the center line of the shaft 12 and the longitudinal axis of the platen 10 is equal to the complement of the angle between the plane 32 and a plane through the center line of the shaft 12 extending perpendicular to the path 18, when the platen 10 is located in position A or position B. It will be seen that when the platen 10 is in position A, surface 28 will be parallel and adjacent to the path 18, while surface 30 is angled away from said path. When the platen is in position B, surface 30 will be parallel and adjacent to the path 18, while surface 28 is angled away from said path.

Positioned on the other side of the path 18 and the record media 16 from the platen 10 is a hammer 34 pivotally mounted at 36 on the support member 14 and having a face 38 capable of coacting with one or the other of the platen faces 28, 30 for printing on the record media 16. A cam 40 rotatably mounted at 42 on the support member 14 cooperates with a cam following surface 44 on the hammer 34 to cause said hammer to move in regularly excursioned movement to provide a printing stroke during each rotation of the cam 40 which is driven at constant speed by a suitable power source (not shown). A return spring 46 maintains the follower surface 44 in engagement with the periphery of the cam 40 and effects the return of the hammer to its extreme non-printing position after each printing stroke. If desired, some suitable hammer actuating means other than a cam and follower arrangement could be employed.

Referring particularly to FIG. 2, it will be seen that when the platen 10 is in position A, the printing surface 28 is parallel and adjacent to the path 18 of record media movement, so that when the hammer 34 is moved in a printing stroke by the cam 40, the ribbon 17 and record media 16 are engaged between the surface 28 and the hammer face 38 to cause a bar symbol to be printed at the left side, as viewed in FIG. 2, of the space on the record media 16 defined by the face 38 of the hammer 34.

On the other hand, when the platen 10 is moved to position B, the face 30 is placed in parallel, adjacent relationship to the record media 16 in the path 18. In this case, a printing stroke by the hammer 34 causes a bar symbol to be printed at the right side, as viewed in FIG. 2, of the space on the record media 16 defined by the face 38 of the hammer 34.

Since a blank, or no printing, in a possible bar position on the record media has been defined in the code as "0", and since the printing of a bar in a possible bar position has been defined in the code as "1", it will be seen that, looking down on the record media 16 as viewed in FIG. 2, a printing stroke with the platen 10 in position A provides a "10", while a printing stroke with the platen in position B provides a "01" symbol. It will, of course, be obvious to one skilled in the art that this invention is not limited to bar codes and the printing of "10" or "01" symbols, and that other types of characters or symbols could be printed as well, if desired, depending upon the configuration provided on the platen surfaces 28 and 30.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

I claim:

1. Apparatus for printing bar code indicia on record media moving in a path through said apparatus, a bar being selectively printed on the record media to one side or the other of a print area to form a code symbol during each printing operation comprising:

a pivotally mounted platen restricted to movement between first and second positions, one end of said platen consisting of two abutting rectangular flat printing surfaces each disposed at an angle such that it is parallel to the path of movement of the record media on which printing is to be performed when said platen is in one of said two positions, and at an acute angle thereto when said platen is in the other of said positions;

first means for causing said platen to be moved to one of said positions;

second means for causing said platen to be moved to the other of said positions;

hammer means movable between an inactive position and a striking position for effecting printing on said record media in said path by engaging said record media between a face of said hammer means and one of said flat surfaces of the platen; and means for moving said hammer means between said inactive position and said striking position.

2. The apparatus of claim 1 in which said first means is a solenoid.

3. The apparatus of claim 2 in which said second means is a spring.

4. The apparatus of claim 1 in which the means for moving the hammer means operates at a constant speed.

5. The apparatus of claim 1 in which the means for moving said hammer means comprises a cam driven at a constant speed.

6. The apparatus of claim 5 in which the hammer means is driven to impact the record media during each rotation of the cam, whereby a symbol is printed on the record media during each such rotation of the cam, said symbol comprising either a bar to one side of the symbol, or a bar to the other side of the symbol.

7. The apparatus of claim 3 in which each of the two flat surfaces of the platen is disposed with respect to a plane extending through the pivotal mounting of the platen and the longitudinal axis of the platen at an angle which is the substantial complement of the angle between said plane and a plane extending through the pivotal mounting of the platen perpendicular to the record media path.

8. The apparatus of claim 1 in which the bar code indicia printed during each operation is either a "01" or a "10"; in which each of said flat surfaces has the configuration of a printed bar; and in which a "01" is printed when the platen is in a first one of said positions, and a "10" is printed when the platen is in a second one of said positions.

9. Apparatus for printing bar code symbols "01" or "10", in which no mark represents "0" and a bar represents "1", on record media moving in a path through said apparatus, a bar being selectively printed on the record media to one side or the other of a print area to form a code symbol during each printing operation comprising:

a platen pivotally mounted adjacent one end thereof and restricted to movement between first and second positions, the other end of said platen consisting of two abutting rectangular flat surfaces, each surface having the configuration of a printed bar and disposed at an angle such that it is parallel to the path of movement of the record media on which printing is to be performed when said platen is in either the first or the second of said two positions, and at an acute angle thereto when said platen is in the other of said two positions;

solenoid means for causing said platen to be moved to one of said positions;

print control means for energizing said solenoid means;

spring means causing said platen to be moved to the other of said two positions when said solenoid means is not energized;

hammer means movable between an inactive position and a striking position for effecting printing on said record media in said path by engaging said record media between a face of said hammer means and one of said flat surfaces of the platen; and constant-speed cam drive means for moving said hammer means between said inactive position and said striking position for the effecting of printing on said record media.

* * * * *

UNITED STATES PATENT AND TRADEMARK OFFICE
CERTIFICATE OF CORRECTION

PATENT NO. : 4,278,018
DATED : July 14, 1981
INVENTOR(S) : Brian J. Johannesson

It is certified that error appears in the above—identified patent and that said Letters Patent is hereby corrected as shown below:

Column 6, line 10, after "said" insert --two--.

Signed and Sealed this

Eighteenth Day of May 1982

[SEAL]

Attest:

GERALD J. MOSSINGHOFF

Attesting Officer

Commissioner of Patents and Trademarks